United States Patent
Tiitinen et al.

(10) Patent No.: US 8,044,161 B2
(45) Date of Patent: Oct. 25, 2011

(54) USE OF TOCOPHEROL

(75) Inventors: Emilia Tiitinen, Helsinki (FI); Harri Jukarainen, Kaarina (FI)

(73) Assignee: Bayer Shering Pharma Oy, Turku (FI)

( * ) Notice: Subject to any disclaimer, the term of this patent is extended or adjusted under 35 U.S.C. 154(b) by 141 days.

(21) Appl. No.: 12/529,338

(22) PCT Filed: Mar. 11, 2008

(86) PCT No.: PCT/FI2008/050113
§ 371 (c)(1),
(2), (4) Date: Aug. 31, 2009

(87) PCT Pub. No.: WO2008/110666
PCT Pub. Date: Sep. 18, 2008

(65) Prior Publication Data
US 2010/0036079 A1    Feb. 11, 2010

(30) Foreign Application Priority Data
Mar. 12, 2007  (EP) .................................... 07103939
Mar. 12, 2007  (EP) .................................... 07103950

(51) Int. Cl.
C08G 77/08  (2006.01)
C08G 77/04  (2006.01)
C07D 311/72  (2006.01)

(52) U.S. Cl. ................. 528/15; 528/12; 528/24; 528/25; 549/398

(58) Field of Classification Search .................... None
See application file for complete search history.

(56) References Cited

U.S. PATENT DOCUMENTS

| | | | | |
|---|---|---|---|---|
| 3,410,886 | A | * | 11/1968 | Joy ................................ 556/479 |
| 5,034,278 | A | * | 7/1991 | Turbett ........................ 428/450 |
| 6,168,782 | B1 | * | 1/2001 | Lin et al. .................... 424/78.03 |
| 6,294,634 | B1 | | 9/2001 | Ferritto et al. .................. 528/14 |
| 2003/0158363 | A1 | * | 8/2003 | Nakanishi ........................ 528/25 |
| 2004/0054114 | A1 | | 3/2004 | Mayorga et al. ................ 528/12 |
| 2005/0090607 | A1 | | 4/2005 | Tapsak et al. .................. 524/588 |
| 2007/0189988 | A1 | | 8/2007 | Golz-Berner et al. ........... 424/59 |

FOREIGN PATENT DOCUMENTS
DE   196 31 227   4/1998
EP   0 860 461   8/1998

OTHER PUBLICATIONS
Fish et al., "Anionic Ring Opening Polymerization of Cyclotetrasiloxanes with Large Substituents," 32 *Makromolekulare Chemie, Macromolecular Symposia* 241 (1990).

* cited by examiner

*Primary Examiner* — Robert Loewe
(74) *Attorney, Agent, or Firm* — James C. Lydon

(57) ABSTRACT

The present invention relates to the use of tocopherol as a co-catalyst in the ring opening polymerisation of cyclic siloxanes. The present invention further relates to a method for manufacturing hydrophilic polysiloxanes, wherein a hydrido-containing cyclic siloxane is reacted with a hydrophilic molecule comprising a carbon-carbon double bond, having the general formula (I) $H_2C=CH-(CHR)_n-O-(CHR^1CR^2R^3)_mR^4$ or (II) $H_2C=CH-(CHR)_n-R^5$, wherein n is an integer from 0 to 4, m is an integer from 0 to 5, R, $R^1$, $R^2$, $R^3$ and $R^4$ are each independently hydrogen or a $C_1$ to $C_6$ alkyl, $R^5$ is a saturated cyclic hydrocarbon containing carbonyl group, in the presence of a first catalyst to obtain a monomer, and polymerising said monomer in the presence of a second catalyst and tocopherol as a co-catalyst.

3 Claims, 3 Drawing Sheets

USE OF TOCOPHEROL

Figure 1:
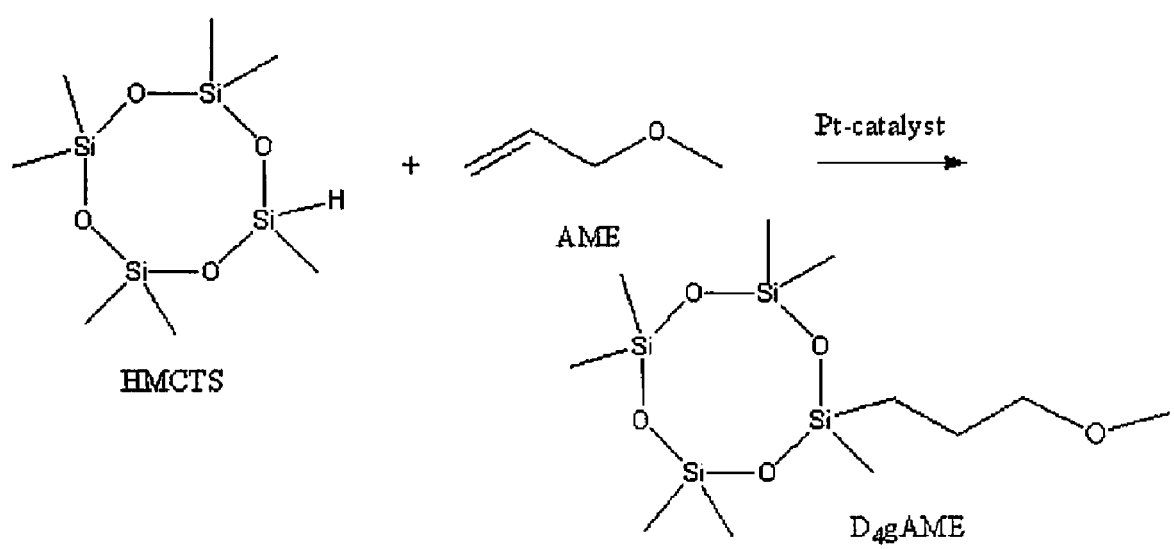

The invention relates to the use of tocopherol as well as to a method for manufacturing hydrophilic polysiloxanes. The invention also relates to hydrophilic polysiloxanes, to a method for manufacturing hydrophilic siloxane elastomers, as well as to hydrophilic siloxane elastomers.

BACKGROUND

Polysiloxanes are applied in many ways in industry e.g. as surfactants, coatings, dispersion agents, dispersion stabilisers, release agents, food additives, sealants, tubes and medical applications. Polysiloxanes are also applied in many ways in medical industry, e.g. in drug delivery applications, both as coatings in conventional pills and as implantable, intravaginal or intrauterine devices. The most commonly used polysiloxane is polydimethylsiloxane (PDMS), which is a highly hydrophobic, stable and temperature resistant material. PDMS is especially suitable for use as membranes regulating the release rate of drugs. However, as PDMS is hydrophobic, it cannot be used for all drugs, depending of the hydrophilicity or hydrophobicity of the drug.

However, when preparing polysiloxanes by ring opening polymerisation of cyclic siloxanes with phosphazene base catalysts, a large amount of catalyst is required, leading to cross-linking of the polymers during storage.

Sterically hindered phenols, such as α-tocopherols and their derivatives have been used in the polymerisation reactions to slow down the reaction and to prevent the formation of gels and oligomers. Tocopherol has also been used as a stabiliser in polymers due to its anti-oxidant effect.

There is, however, still a need to provide a co-catalyst suitable for reducing the amount of catalyst used during the ring opening polymerisation of cyclic siloxanes. There is also a need to provide a component capable of strongly reducing, if not completely avoiding, the cross-linking of the polymers thus obtained during storage.

Concerning the medical applications, the release rate of the drug has traditionally been regulated by changing the parameters of the drug release system, for example by changing the surface area, the thickness of the membrane, the quantity of the drug or the amount of fillers in the membrane regulating the release. However, if a significant change of the release rate is desired or if the dimensions of the delivery device cannot be modified, the constitution of the polymer needs to be modified.

It is known that the diffusion properties of polydimethylsiloxane can be varied by adding to the polymer substituent groups that decrease or increase the release rate.

The addition of polyethylene oxide (PEO) groups into PDMS polymer can increase the release rate of drugs. Ullman et al. presents in Journal of Controlled Release 10 (1989) 251-260 membranes made of block copolymer comprising polyethylene oxide and PDMS, and the release of different steroids through these membranes. According to the publication, the release of hydrophilic steroids is increased and the release of lipophilic steroids is decreased, when the amount of PEO groups increases. In that study the PEO groups are connected to the silicon atoms of the siloxane groups via a urea-bond.

Patent Fl 107339 discloses regulating the release rate of drugs by a siloxane-based elastomer composition comprising at least one elastomer and possibly a non-crosslinked polymer, as well as a method for manufacturing said elastomer composition. The elastomer or the polymer of the composition comprises polyalkylene oxide groups as alkoxy-terminated grafts or blocks of the polysiloxane units, or a mixture of these. The alkoxy-terminated grafts or blocks are connected to the siloxane units by silicon-carbon-bonds.

Publication Hu et al. "Synthesis and drug release property of polysiloxane containing pendant long alkyl ether group", Gaofenzi Xuebao, (1) 6247, 1997 Kexue (CA 126:200090) presents a silicone based polymer that has been grafted with ether groups after the polymerization step, thus leaving the hydrosilation catalyst (Pt) inside the polymer. The polymer is useful when mixed with silicone rubber. The publication only discloses simple ether groups. The polymer grafted as disclosed decreases the release rate of the drugs.

U.S. Pat. No. 6,346,553 discloses alkylmethylsiloxane-polyalkyleneoxide-dimethylsiloxane-copolymers, that are suitable for use as surface-active agent for both oil-water-emulsions and silicone-water-emulsion, and a method for manufacturing said copolymers. The copolymers can be manufactured by a hydrosilylation reaction between a straight chain or branched chain olefin and a cyclic siloxane, using platinum catalyst, distilling the alkylated cyclic siloxane, polymerising the mixture of said tetramethyldisiloxane and possibly another cyclic siloxane in the presence of an acidic catalyst. The obtained polymer is finally hydrosilylated with a terminally unsaturated polyalkyleneoxide polymer.

U.S. Pat. No. 6,294,634 presents a method for manufacturing siloxane compositions by heating a mixture of dimethylsiloxane, alkyl-substituted cyclic siloxane and a cyclic siloxane comprising a oxyalkylene-group, in the absence of solvent. The polymerisation catalyst can be, for example, alkaline metal hydroxide, alkoxide or silanolate, Lewis acids, acidic phosphazenes or basic phosphazenes. The composition comprises only small residues of platinum or is completely free from platinum.

U.S. Pat. No. 3,427,271 discloses organic polysiloxanes that are formed of dimethylsiloxane units, methyl-oxyalkyl-siloxane units and siloxane units that are substituted with methyl group and a higher alkyl group. The polymerisation reaction uses platinum catalyst.

OBJECTS AND SUMMARY OF THE INVENTION

In view of the above-mentioned, it is an object of the present invention to provide a co-catalyst suitable for reducing the amount of catalyst. It is also an object to reduce the cross-linking of the polymers during storage.

One object of the present invention is to provide a platinum free elastomer with which the release rate of the drug is easily controlled.

A yet another object is to provide an elastomer that also has sufficient mechanical properties.

The present invention thus relates to the use of tocopherol as a co-catalyst in the ring opening polymerisation of cyclic siloxanes.

The present invention further relates to a method for manufacturing hydrophilic polysiloxanes, wherein a hydrido-containing cyclic siloxane is reacted with a hydrophilic molecule comprising a carbon-carbon double bond, having the general formula (I) or (II)

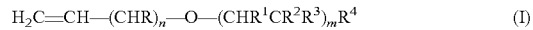

wherein n is an integer from 0 to 4, m is an integer from 0 to 5, R, $R^1$, $R^2$, $R^3$ and $R^4$ are each independently hydrogen or a $C_1$ to $C_6$ alkyl, $R^5$ is a saturated cyclic hydrocarbon containing carbonyl group, in the presence of a first catalyst to obtain a monomer and polymerising said monomer in the presence of a second catalyst and tocopherol as a co-catalyst.

The present invention also provides a hydrophilic polysiloxane having the formula (III)

$$EB-[B_1-B_2-B_3]_k-EB \qquad (III)$$

wherein

EB is an end blocker group, $B_1$, $B_2$ and $B_3$ is independently selected from the group consisting of a —Si—O— chain comprising a hydrophilic group and a methyl group, a —Si—O— chain comprising two methyl groups and a —Si—O— chain comprising a vinyl group and a methyl group, said $B_1$, $B_2$ and $B_3$ are randomly distributed along the chain of the polysiloxane, and k is an integer from 15 to 50 000, obtainable by the method according to the present invention.

The invention yet further relates to a method for manufacturing a hydrophilic siloxane elastomer, comprising cross-linking a polysiloxane according to the present invention, in the presence of a cross-linking catalyst, as well as to a hydrophilic siloxane elastomer obtainable by said method.

SHORT DESCRIPTION OF THE DRAWINGS

FIG. 1 presents an example of monomer synthesis according to an embodiment of the present invention.

Figure 2:
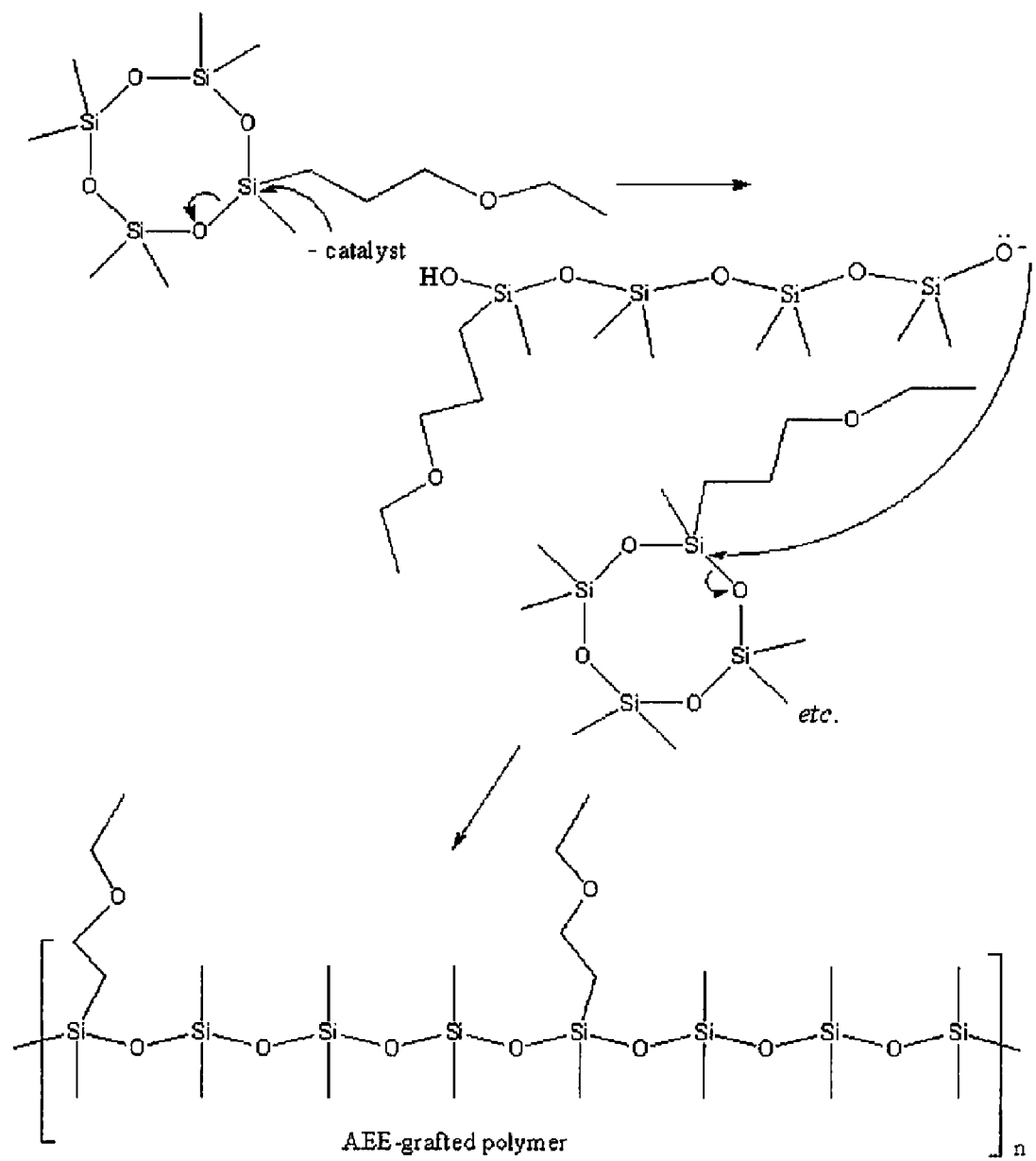

FIG. 2 presents an example of anionic ring-opening polymerisation according to an embodiment of the present invention.

Figure 3:
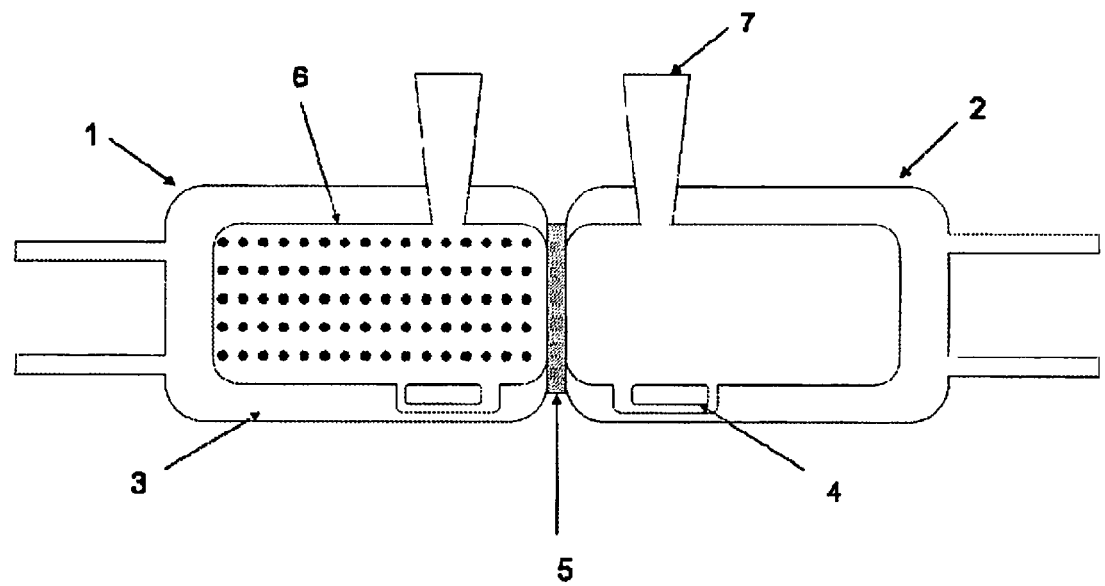

FIG. 3 presents an arrangement for measuring the drug release.

Figure 4:
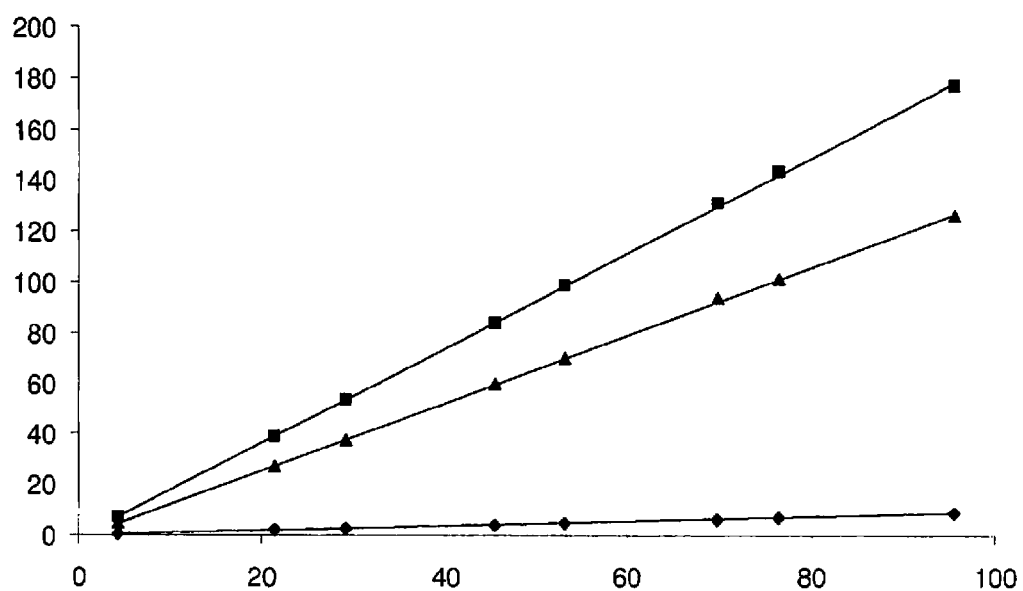

FIG. 4 presents some drug permeation results measured with elastomers according to the present invention.

DETAILED DESCRIPTION OF THE INVENTION

The present invention relates to the use of tocopherol as a co-catalyst in the ring opening polymerisation of cyclic siloxanes.

As will be shown later in the Experimental part, using tocopherol as a co-catalyst in the ring opening polymerisation of cyclic siloxanes, the amount of catalyst needed for such reaction is reduced. Furthermore, the cross-linking of the polymers during storage is greatly reduced when tocopherol has been used as a co-catalyst in the ring opening polymerisation.

According to one embodiment of the present invention said tocopherol is selected from the group consisting of D'L-alpha-tocopherol, RRR-alpha-tocopherol, D'L-alpha-tocopherol acetate and RRR-alpha-tocopherol acetate. Mixtures of these compounds can naturally also be used.

According to another embodiment the cyclic siloxane is selected from the group consisting of heptamethyl cyclotetrasiloxane and tetramethyl cyclotetrasiloxane.

The present invention further relates to a method for manufacturing hydrophilic polysiloxanes, wherein a hydrido-containing cyclic siloxane is reacted with a hydrophilic molecule comprising a carbon-carbon double bond, having the general formula (I) or (II)

$$H_2C=CH-(CHR)_n-O-(CHR^1CR^2R^3)_mR^4 \qquad (I)$$

$$H_2C=CH-(CHR)_n-R^5 \qquad (II)$$

wherein n is an integer from 0 to 4, m is an integer from 0 to 5, R, $R^{11}$, $R^2$, $R^3$ and $R^4$ are each independently hydrogen or a $C_1$ to $C_6$ alkyl, $R^5$ is a saturated cyclic hydrocarbon containing carbonyl group, in the presence of a first catalyst to obtain a monomer, and polymerising said monomer in the presence of a second catalyst and tocopherol as a co-catalyst.

The details and embodiments listed above also apply to the method according to the present invention.

The present invention thus relates to a method for manufacturing hydrophilic polysiloxanes that provides polydimethyl siloxane polymers that do not exhibit any undesired cross-linking during the polymerisation and the storage of the polymer. These polymers can be cross-linked to form a more hydrophilic elastomer than PDMS elastomers. Such an elastomer allows an easy and accurate control of the release rate of the drug from polymer based drug delivery system.

According to an embodiment of the invention the monomer containing hydrophilic moiety is purified before the polymerisation. This allows the manufacture of a hydrophilic silicone elastomer that is essentially free from catalyst residues from the hydrosilation reaction. When a platinum catalyst is used in this first step, the resulting elastomer made according to this embodiment is essentially platinum free, provided that no platinum is used in the cross-linking step.

The monomer obtained can be purified with any known method, such as by distillation under reduced pressure. The aim of the purification is the elimination of unreacted unsaturated starting material, alkylated products formed thereof and especially the elimination of the residues of the catalyst, such as platinum residues. At the moment, distillation is the simplest way to totally exlude the platinum catalyst from the final elastomers and is thus preferred method in the present invention.

According to an embodiment the hydrido-containing cyclic siloxane is selected from the group consisting of heptamethyl cyclotetrasiloxane and tetramethyl cyclotetrasiloxane. Also other further cyclic siloxanes can be used in the copolymerization, such as octamethyl cyclotetrasiloxane.

According to another embodiment the hydrophilic molecule is selected from the group consisting of allyl ethyl ether, allyl methyl ether, allyl propyl ether, allyl butyl ether, allyl pentyl ether, butyl vinyl ether, propyl vinyl ether, tert-pentyl vinyl ether and allyl acetate.

The reaction temperature in the hydrosilation reaction can vary from room temperature up to 250-300° C., preferably it is from 20 to 170° C. and more preferably from 50 to 170° C., even more preferably from 50 to 95° C. It may be necessary to heat the reaction to 100° C. or above, especially if the activity of the catalyst has been reduced by the presence of water in the reaction mixture or by slurrying the catalyst into diluent.

Suitable catalysts are, for example, platinum based or platinum complex based hydrosilylation catalysts that are described for example in U.S. Pat. Nos. 3,220,972; 3,715,334; 3,775,452; 3,814,730; 4,421,903 and 4,288,345. Some suitable catalysts are chloroplatinate, platinum-acetylacetonate, platinum divinyldisiloxane complex, hexamethyldiplatinum and complexes of platinum halides with different compounds having double bonds, such as ethylene, propylene, organic vinylsiloxanes or styrene. Also other catalysts, such as ruthenium, rhodium, palladium, osmium and iridium as well as their complexes, can be used.

According to a preferred embodiment the first catalyst is a platinum catalyst. As the monomer is preferably purified before polymerisation, the obtained polymer and further the obtained elastomer are platinum free, provided that platinum is not used in the crosslinking step.

The polymerisation may be a homopolymerisation or a copolymerisation, in which case a comonomer is present in the polymerisation step. The comonomer can for example be a vinyl comonomer selected from the group consisting of vinyl containing cyclic and linear low molecular weight siloxanes, such as 1,3,5,7-tetravinyl-1,3,5,7-tetramethyl cyclotetrasiloxane. The cyclic siloxane can thus be copolymerised with different cyclic siloxanes and/or linear siloxanes.

The ring opening polymerisation is typically catalysed by either acidic or basic catalysts. Examples of suitable basic catalysts are alkaline metal hydroxides and their complexes with alcohols, alkaline metal alkoxides, alkaline metal silanolates and different phosphorous nitric halides. Preferred catalysts are potassium silanolates and phosphazene bases. Examples of suitable acidic catalysts are strong acids, such as sulphuric acid, acetic acid or trifluoromethane sulfonic acid, Lewis acids, such as boron trifluoride or aluminium chloride, or strongly acidic ion exchange resins.

The polymerisation can, for example, be carried out in a solvent, without a solvent or as an emulsion. In some cases, a suitable solvent can be used in order to regulate the reaction rate and in order to achieve a certain degree of polymerisation if a solvent is used, some suitable solvents are liquid hydrocarbons such as hexane and heptane, silicones such as polydiorganosiloxanes, silanols such as trialkylsilanol and in some cases alcohols, such as alcohols comprising 1 to 8 carbon atoms. In some cases, the water present in the reaction renders the controlling of the reaction easier.

According to yet another embodiment an end-blocker is present in the polymerisation step. Said end-blocker can be selected from the group consisting of linear low molecular weight siloxanes, such as 1,1,3,3-tetravinyl dimethylsiloxane.

The end-blocker can be used to regulate the molar mass of the polymer or to introduce functional groups to the ends of the polymer chain.

According to an embodiment of the invention said second catalyst is selected from the group consisting of phosphazene bases, ammonium silanolates, potassium silanolates, sodium silanolates, lithium silanolates and mixtures thereof.

Phosphazene bases are efficient catalysts in polymerisation reactions and the amount of catalyst used can be rather small, for example 1-2000 ppm based on the amount of siloxane, preferably 2-1000 ppm and more preferably 2-500 ppm. In practice, the amount of catalyst is also dependent on the reaction rate and the desired molar mass of the polymer. The amount of catalyst can be, for example, from 2 to 200 ppm.

Any suitable phosphazene base can be used as a catalyst, especially those that are in liquid form or that can be dissolved in a liquid. Some examples of commercially available phosphazene bases are 1-tert-butyl-4,4,4-tris(dimethylamino)-2, 2-bis[tris(dimethylamino)-phosphoranylidenamino]-2$\Delta^5$, 4$\Delta^5$-catenadi(phosphazene), 1-tert-butyl-2,2,4,4,4-pentakis (dimethylamino)-2$\Delta^5$,4$\Delta^6$-catenadi(phosphazene) and 1-tert-octyl-4,4,4-tris(dimethylamino)-2,2-bis[tris(dimethylamino)-phosphoranylidenamino]-2$\Delta^5$,4$\Delta^5$-catenadi(phosphazene).

The reaction time in the polymerisation step can vary from 30 minutes to several hours, depending on the activity of the catalyst and on the desired product. The polymerisation temperature can vary from room temperature to 250° C., preferably from 80 to 200° C. and more preferably from 120 to 150° C.

The polymerisation reaction can be controlled by taking samples at regular intervals and by analysing them with any known method, such as following the molar mass by gel permeation chromatography. The polymerisation reaction can be terminated by adding a suitable neutralising reagent that inactivates the catalyst. Typically, the reactions are performed under inert atmosphere, such as nitrogen.

The present invention also relates to hydrophilic polysiloxanes having the formula (III)

EB—[B$_1$—B$_2$—B$_3$]$_k$-EB     (III)

wherein
EB is an end blocker group, B$_1$, B$_2$ and B$_3$ is independently selected from the group consisting of a —Si—O— chain comprising a hydrophilic group and a methyl group, a —Si—O— chain comprising two methyl groups and a —Si—O— chain comprising a vinyl group and a methyl group, said B$_1$, B$_2$ and B$_3$ are randomly distributed along the chain of the polysiloxane, and k is an integer from 15 to 50 000.

This hydrophilic polysiloxane can be obtained by the method according to the present invention.

According to one embodiment of the invention the hydrophilic group is selected from the group consisting of propylethylether, ethylbutylether, propylcyclohexanone, propylmethylether, dipropylether, propylbutylether, propylpentylether, ethylpropylether, ethyl-tert-pentylether and propylacetate.

According to another embodiment of the invention the end blocker group is selected from the group consisting of linear low molecular weight siloxanes.

According to an embodiment of the invention, the polymer material is curable, i.e. cross-linkable with a cross-linking catalyst. According to an embodiment, the cross-linking catalyst is peroxide. Should it not be necessary that the elastomer is platinum-free, a platinum-based cross-linking catalyst can be used. The details and embodiments listed above also apply to this hydrophilic polysiloxane according to the present invention.

The invention yet further relates to a method for manufacturing a hydrophilic siloxane elastomer, comprising cross-linking a polysiloxane according to the present invention, in the presence of a cross-linking catalyst, as well as to a hydrophilic siloxane elastomer obtainable by said method. According to one embodiment, the cross-linking catalyst can be for example a peroxide cross-linking catalyst or a platinum cross-linking catalyst. If platinum free elastomer is wanted, peroxide crosslinking should preferably be employed.

According to yet another aspect the present invention relates to hydrophilic siloxane elastomer obtainable by the method described above.

The details and embodiments listed above also apply to this method and to the elastomer according to the present invention.

The elastomer is typically manufactured by cross-linking using any known catalysts and/or initiators, such as peroxides, irradiation, hydrosilylation or condensation. For example, organic vinyl specific or non-specific peroxides can be used, such as di-tert-butylperoxide and 2,5-bis-(tert-butylperoxide)-2,5-dimethylhexane or benzoylperoxide, tert-butylperoxy-2-ethylhexanoate and/or 2,4-dichlorobenzoylperoxide. The amount of catalyst varies, for example, from 0.1 to 5 parts per weight per 100 parts of siloxane.

Siloxane-based elastomer as used here can stand for an elastomer made of disubstituted siloxane units, wherein the substituents can be substituted or unsubstituted lower alkyls, preferably C$_1$ to C$_6$ alkyls or phenyl groups. A certain amount of the substituents attached to the silicon atoms are substituted oxyalkyl groups that are attached to the silicon atoms by a silicon-carbon bond.

By C$_1$ to C$_6$ alkyls in this context are meant methyl, ethyl, propyl, butyl, pentyl and hexyl, and all their isomers.

In the following, when substituted oxyalkyl groups are mentioned, it is meant such substituted oxyalkyl groups that are attached to the silicon atoms by a silicon-carbon bond.

According to one embodiment the elastomer composition can be formed of one single cross-linked siloxane based polymer. According to another embodiment, the elastomer composition can be formed of two interpenetrating elastomers. The first elastomer can then comprise substituted oxyalkyl groups as described above, and the second elastomer can be a siloxane based elastomer such as PDMS. The second elastomer can also comprise substituted oxyalkyl groups as described above.

The elastomer composition according to the present invention can be used as a membrane (or film) or matrix for regulating the release rate of a drug. By drug it is meant any kind of pharmaceutically active ingredient that can be administered into mammals. The membranes or films can be manufactured by any known method, such as by casting, extrusion, pressing, moulding, coating, spraying or dipping.

The drug release rate of the elastomer may be controlled by the amount of substituted oxyalkyl groups and/or by the properties of the drug.

According to yet another embodiment the elastomer composition may be a mixture comprising a siloxane based elastomer (for example PDMS) and at least one polysiloxane polymer or copolymer comprising substituted oxyalkyl groups. Also the siloxane based elastomer may comprise such substituted oxyalkyl groups.

According to an embodiment the elastomer composition also comprises a filler, such as amorphous silica, in order to increase the strength of the film made from the elastomer composition. Other possible fillers include aluminium oxide, titanium oxide, mica, calcium carbonate, various fibres and barium sulphate. The amount of filler depends on the nature of the filler and the use of the elastomer. Reinforcing fillers, such as silica, are typically used in an amount from 1 to 50, preferably from 15 to 40 parts per weight and the other fillers in an amount from 1 to 200 parts per weight.

EXPERIMENTAL PART

Polymerisations were carried out in an oil bath in a 100 ml round bottom glass vessel with mechanical stirring and under nitrogen atmosphere. Monomer and other starting chemicals, such as D'L-α-tocopherol (0.01 wt-%), vinyl comonomer (e.g tetramethyltetraviniylcycloterasiloxane ($MV_4$), 0.01 mol-%) or vinyl copolymer and end blocker (e.g. tetramethyl divinyl disiloxane) were introduced to the vessel. Through changing the stoichiometry starting chemicals with each other the molecular weight of the polymer and crosslinking density of the prepared elastomer could be varied. Polymerisation temperature was 150° C. and mixing rather vigorous (200-400 rpm). When the temperature of the reaction solution reached 150° C., 50 ppm of catalyst 1-tert-butyl-4,4,4-tris(dimethylamino)-2,2-bis[tris(dimethylamino)-phosphoranylidenamino]-2$\Delta^5$,4$\Delta^5$-catenadi(phosphazene) was added with microsyringe through the septum below the surface of the solution. Ring opening polymerisation started either right away and proceeded to the end fast or gradually during about 30 min. When polymerisation had reached the target, the catalyst was deactivated by the addition of an equivalent amount of tris(trimethylsilyl)phosphate. At the early stage of reaction the viscosity raised quickly and in some experiments the viscosity started to decline slightly during polymerisation. This phenomenon was attributed to the growing amount of low molecular weight cyclic molecules and linear molecules as polymerisation proceeded to its thermodynamic equilibrium.

Example 1

Starting Chemicals

Substituent: Allylethylether (Aldrich)
Starting siloxane: Heptamethylcyclotetrasiloxane (Clariant)
Catalyst of the monomer synthesis: Pt-divinyltetramethyldisiloxane, 2.3 wt-% of Pt in xylene (ABCR)
Polymerisation catalyst: Phosphazene base (1-tert-butyl-4,4,4-tris(dimethylamino)-2,2-bis[tris(dimethylamino)-phosphoranylidenamino]-2$\Delta^5$,4$\Delta^5$-catenadi(phosphazene) (Fluka Chimika)
Co-catalyst: D'L-α-tocopherol (Roche)
Vinylcomonomer: 1,3,5,7-tetravinyl-1,3,5,7-tetramethylcyclotetrasiloxane, $MV_4$ (Gelest)
End blocker: Vinyl terminated poly(dimethylsiloxane), DMS-V21 (ABOR)
Polymerisation catalyst deactivator: tris(trimethylsilyl)phosphate (Fluka Chimika)

Monomer Synthesis

Heptamethylcyclotetrasiloxane and allylethylether were weighed in a 50 ml glass round bottom vessel equipped with reflux condenser, the stoichiometric relation used was 1.1:1 (vinyl:SiH). The vessel was placed in an oil bath and nitrogen was purged through the vessel. The oil bath was heated up to 65° C. and the catalyst (20 ppm Pt) was added with a microsyringe through the septum into the reaction solution. After a few minutes there was an exotherm and the colour of the medium changed from clear to brownish. The reaction was followed with FT-IR by the disappearance of SiH (2100 $cm^{-1}$) and vinyl (1650 $cm^{-1}$) absorptions. Samples were taken regularly every hour and after 2.5 hours the reaction had finished according to FTIR (vinyl peak at 1650 $cm^{-1}$ disappeared).

The monomer thus prepared (1,1-3,3-5,5-7-heptamethyl-7-propylethylether-cyclotetrasiloxane) was distilled under reduced pressure (P<10 mbar). It was found out that the most of the predistillate was unreacted heptamethylcyclotetrasiloxane. Distillation was also carried out to remove the platinum from the monomer (distillate). The purity of the monomer was analyzed with gas chromatography (Agilent Technologies 6890 N network GC System. FID detector) and it was found to be 95% pure (area %).

Polymerisation of 1,1-3,3-5,5-7-heptamethyl-7-propylethylether-cyclotetrasiloxane Ring opening polymerisation was carried out in a 100 ml glass round bottom vessel with overhead stirring, under nitrogen atmosphere. The temperature of the polymerisation was set to 150° C. The vessel was charged with 25 g of monomer (98.69 wt-%), 0.01 wt-% of D'L-α-tocopherol, 0.10 wt-% of $MV_4$ and 1.20 wt-% of end blocker. When the reaction medium had reached the target temperature, phosphazene catalyst (50 ppm) was added through the septum. Polymerisation initiated slowly, until after 10 minutes there was a notable rise in the viscosity. Polymerisation was continued with a slower mixing for 30 min, after which the catalyst was deactivated with an equivalent amount of tris(trimethylsilyl) phosphate.

The polymer was then stripped from volatile components in a short path wiped film evaporator (P<1 mbar, T=90 C.°). This was carried out to remove unreacted monomer and low molecular weight cyclic and linear molecules from the polymer.

Example 2

Starting Chemicals

Substituent: n-Butylvinylether (BASF)
Starting siloxane: Heptamethylcyclotetrasiloxane (Clariant)

Catalyst of the monomer synthesis: Pt-divinyltetramethyldisiloxane, 2.3 wt-% of Pt in xylene (ABCR)
Polymerisation catalyst: Phosphazene base (1-tert-butyl-4,4,4-tris(dimethylamino
End blocker: 1,1,3,3-tetravinyldimethyldisiloxane (ABCR)
Polymerisation catalyst deactivator: tris(trimethylsilyl)phosphate (Fluka Chimika) )-2,2-bis[tris(dimethylamino)-phosphoranylidenamino]-2$\Delta^5$,4$\Delta^5$-catenadi(phosphazene) (Fluka Chimika)
Vinylcomonomer: 1,3,5,7-tetravinyl-1,3,5,7-tetramethylcyclotetrasiloxane, $MV_4$ (Gelest)
End blocker: 1,1,3,3-tetravinyldimethyldisiloxane (ABCR)
Polymerisation catalyst deactivator: tris(trimethylsilyl)phosphate (Fluka Chimika)

Monomer Synthesis

The same steps as in Example 1 were used for the monomer synthesis. The substituent (n-butylvinylether) used made the reaction proceed much faster (total time 0.5 h) and complete. No extra Si—H were observed according to FTIR (at 2050 cm$^{-1}$). Product 1,1-3,3-5,5-7-heptamethyl-7-ethylbutylether-cyclotetrasiloxane was purified by distillation.
Polymerisation of 1,1-3,3-5,5-7-heptamethyl-7-ethylbutylether-cyclotetrasiloxane
The same steps as in Example 1 were used for the polymer synthesis. The charged starting chemicals were 25 g of 1,1-3,3-5,5-7-heptamethyl-7-ethylbutylether-cyclotetrasiloxane (99.4 wt-%). 0.10 wt-% vinyl comonomer ($MV_4$) and 0.80 wt-% of end-blocker. To start the polymerisation the needed catalyst amount was 100 ppm that was charged in two steps through septum over a time of 30 minutes. Polymerisation resulted in a polymer with lower molecular weight when compared to Example 1.

Example 3

Starting Chemicals

Substituent: n-Butylvinyl ether (BASF)
Starting siloxane: Heptamethylcyclotetrasiloxane (Clariant)
Catalyst of the monomer synthesis: Pt-divinyltetramethyldisiloxane, 2.3 wt-% of Pt in xylene (ABCR)
Polymerisation catalyst: Phosphazene base (1-tert-butyl-4,4,4-tris(dimethylamino)-2,2-bis[tris(dimethylamino)-phosphoranylidenamino]-2$\Delta^5$,4$\Delta^6$-catenadi(phosphazene) (Fluka Chimika)
Co-catalyst: D'L-α-tocopherol (Roche)
Vinylcomonomer: 1,3,5,7-tetravinyl-1,3,5,7-tetramethylcyclotetrasiloxane, $MV_4$ (Gelest)
End blocker: 1,1,3,3-tetravinyldimethylsiloxane, (ABCR)
Polymerisation catalyst deactivator: tris(trimethylsilyl)phosphate (Fluka Chimika)

Monomer Synthesis

The same steps as in Example 1 were used for the monomer synthesis. This time with different substituent (n-Butylvinyl ether) the reaction was much faster and it was complete after 0.5 h. No Si—H groups were remaining according to FT-IR. Polymerisation of 1,1-3,3-5,5-7-heptamethyl-7-ethylbutylether-cyclotetrasiloxane
The same steps as in Example 1 were used for the polymerisation. Polymerisation started faster (according to viscosity) and was more complete than in Examples 1 and 2.

Example 4

Starting Chemicals

Substituent: 2-Allylcyclohexanone (Aldrich)
Starting siloxane: Heptamethylcyclotetrasiloxane (Clariant)
Catalyst of the monomer synthesis: Pt-divinyltetramethyldisiloxane, 2.3 wt-% of Pt in xylene (ABCR)
Polymerisation catalyst: Phosphazene base (1-tert-butyl-4,4,4-tris(dimethylamino)-2,2-bis[tris(dimethylamino)-phosphoranylidenamino]-2$\Delta^5$,4$\Delta^5$-catenadi(phosphazene) (Fluka Chimika)
Co-catalyst: D'L-α-tocopherol (Roche)
Vinylcomonomer: 1,3,5,7-tetravinyl-1,3,5,7-tetramethylcyclotetrasiloxane, $MV_4$ (Gelest)
Monomer Synthesis The same steps as in Example 1 were used for the monomer synthesis. Hydrosilation reaction happened gradually during 2 hours (according to FTIR), the colour changed to yellowish concurrently. The product 1,1-3,3-5,5-7-heptamethyl-7-propylcyclohexanone-cyclotetrasiloxane was purified by distillation.
Polymerisation of 1,1-3,3-5,5-7-heptamethyl-7-propylcyclohexanone-cyclotetrasiloxane
The same steps as in Example 1 were used for the polymerisation. Polymerisation did not start until the amount of catalyst, that was gradually added, was 600 ppm. Polymerisation proceeded slower than in experiments 1 to 3.

Example 5

Starting Chemicals

Substituent: n-Butylvinyl ether (BASF)
Starting siloxane: Heptamethylcyclotetrasiloxane (Clariant)
Catalyst of the monomer synthesis: Pt-divinyltetramethyldisiloxane, 2.3 wt-% of Pt in xylene (ABCR)
Polymerisation catalyst: Phosphazene base (1-tert-butyl-4,4,4-tris(dimethylamino)-2,2-bis[tris(dimethylamino)-phosphoranylidenamino]-2$\Delta^5$,4$\Delta^5$-catenadi(phosphazene) (Fluka Chimika)
Co-catalyst; D'L-α-tocopherol (DSM)
Vinylcomonomer: 1,3,5,7-tetravinyl-1,3,5,7-tetramethylcyclotetrasiloxane, $MV_4$ (Gelest)
End blocker: 1,1,3,3-tetravinyldimethylsiloxane, (ABCR)
Polymerisation catalyst deactivator: tris(trimethylsilyl)phosphate (Fluka Chimika)

Monomer Synthesis

The same steps as in Example 1 were used for the monomer synthesis. Reaction time was faster than in examples 1 and 2, that is, approximately 10 minutes. At the end of the reaction, the medium did not contain any SiH groups according to FTIR. Product 1,1-3,3-5,5-7-heptamethyl-7-ethylbutylether-cyclotetrasiloxane was purified by distillation.
Polymerisation of 1,1,3,3,5,5,7-heptamethyl-7-ethylbutylether-cyclotetrasiloxane
The same steps as in Example 1 were used for the polymerisation. Polymerisation reaction was successful.

Example 6

Starting Chemicals

Substituent: Allylethylether (Aldrich)
Starting siloxane: Heptamethylcyclotetrasiloxane (Clariant)

Catalyst of the monomer synthesis: Pt-divinyltetramethyldisiloxane, 2.3 wt-% of Pt in xylene (ABCR)

Polymerisation catalyst: Phosphazene base (1-tert-butyl-4,4,4-tris(dimethylamino)-2,2-bis[tris(dimethylamino)-phosphoranylidenamino]-2$\Delta^5$,4$\Delta^5$-catenadi(phosphazene) (Fluka Chimika)

Co-catalyst: D'L-α-tocopherol (Roche)

Vinylcomonomer: 1,3,5-trivinyl-1,3,5-trimethylcyclotetrasiloxane, MV$_3$ (Gelest)

End blocker: Vinyl terminated poly(dimethylsiloxane). DMS-V21 (ABCR)

Polymerisation catalyst deactivator: tris(trimethylsilyl)phosphate (Fluka Chimika)

Reinforcing fumed silica: Aerosil R106 (Degussa)

Curing agent: tertbutylperoxy-2-ethylehexanoate TBPEH (Interchim Austria)

Monomer Synthesis

The allylethylether and heptamethylcyclotetrasiloxane were charged in a round bottom glass vessel equipped with reflux condenser. The vinyl/SiH stoichiometry was 1.1:1. The vessel was set in an oil bath and the reaction was carried under nitrogen atmosphere. Oil bath was heated to 65° C. and the catalyst (20 ppm Pt) was added through septum. After a few minutes an exotherm was noticed and concurrently the colour of reaction medium changed from clear to brownish. The reaction was followed with FT-IR by the disappearance of SiH (2100 cm$^{-1}$) and vinyl (1650 cm$^{-1}$) absorptions. Samples were taken regularly every hour and after 2.5 hours the reaction had finished according to FTIR (vinyl peak at 1650 cm$^{-1}$ had disappeared). The monomer thus prepared (1,1-3,3-5,5-7-heptamethyl-7-propylethylether-cyclotetrasiloxane), was distilled under reduced pressure (p<10 mbar). It was found out that the most of the predistillate was unreacted heptamethylcyclotetrasiloxane. Distillation was also carried out to remove the platinum from the monomer (distillate). The purity of the monomer was analyzed with GC and it was found to be 95% pure (area %).

Polymerisation of 1,1,3,3,5,5,7-heptamethyl-7-propylethylether-cyclotetrasiloxane)

Ring opening polymerization was carried out in a 100 ml glass round bottom vessel with overhead stirring, under nitrogen atmosphere. The temperature of the polymerisation was set to 150° C. The vessel was charged with 25 g of monomer (98.09 wt-%), 0.01 wt-% of D'L-α-tocopherol, 0.70 wt. % of MV$_3$ and 1.20 wt-% of end blocker. When the reaction medium had reached the target temperature, phosphazene catalyst (50 ppm) was added through the septum. Polymerisation initiated slowly, until after 10 minutes there was a notable rise in the viscosity. Polymerisation was continued with a slower mixing for 30 min, after which the catalyst was deactivated with an equivalent amount of tris(trimethylsilyl) phosphate.

The polymer was then stripped from volatile components in a short path wiped film evaporator (P<1 mbar, T=90° C.). This was carried out to remove unreacted monomer and low molecular weight cyclic molecules and linear molecules from the polymer.

Elastomer Preparation

The stripped polymer was compounded in a kneading mill with 25 wt-% of fumed silica and 1.5 wt-% of TBPEH-peroxide. When the base in the mill was homogeneous, it was used to prepare sheets of different thicknesses in a hot press (120° C.) between release films. These sheets were subsequently post cured in vacuum oven (100° C., P<10 mbar, 1 h) to remove the peroxide decomposition products.

Examples 7-16

In these examples, different polymerisable hydrophilically modified monomers were prepared. These monomers were then copolymerised with vinyl-functional comonomers. Prepared polymers were then mixed with silica and cured using a vinyl-specific peroxide, and tested for their use in medical applications for releasing of drugs.

Monomer Preparation

The monomers used were synthesised by hydrosilation of heptamethyl cyclotetrasiloxane (HMCTS, Clariant) and selected double-bond-containing hydrophilic molecules. Hydrophilic groups were mostly ether-like structures with a terminal double-bond. Platinum-divinyl tetramethyl disiloxane (Pt-DVTMDS, ABCR) complex was used as a catalyst for hydrosilation, in some occasions also solid platinum and palladium catalysts were tested. The vinyl/Si—H molar ratio was most often 1.1:1. Reactions were first carried out in 8 ml vials with simply heating the reaction mixture under stirring in oil bath. If this small scale experiment was successful, the next step was to scale up the reaction and to produce enough material to be distilled and polymerized. Most often temperature was about 65° C. and used catalyst amount was 20 ppm.

Some components are mentioned below with their abbreviated names. For example,

HMCTS stands for heptamethyl cyclotetrasiloxane,

Pt-DVTMDS stands for platinum-divinyl tetramethyl disiloxane complex,

MV$_4$ stands for 1,3,5,7-tetravinyl-1,3,5,7-tetramethyl cyclotetrasiloxane,

MV$_3$ stands for 1,3,5-trivinyl-1,3,5-trimethyl cyclotrisiloxane,

D4gAME stands for 1,1,3,3,5,5,7-heptamethyl-7-propylmethylether cyclotetrasiloxane, D4gAEE stands for 1,1,3,3,5,5,7-heptamethyl-7-propylethylether cyclotetrasiloxane.

D4gBVE stands for 1,1,3,3,5,5,7-heptamethyl-7-ethylbutylether cyclotetrasiloxane D4gACHN stands for 1,1,3,3,5,5,7-heptamethyl-7-propylcyclohexanone cyclotetrasiloxane, DMS-V21 stands for vinyl terminated polydimethylsiloxane, and TBPEH stands for tert-butylperoxy-2-ethylhexanoate.

In these examples, four different derivatives were tested for monomer synthesis. Their structures, names, abbreviations and producers are presented in Table 1.

TABLE 1

|  |  |  |
|---|---|---|
| Allyl ethyl ether | AEE | Aldrich |
| Allyl methyl ether | AME | ABCR |

TABLE 1-continued

| | | | |
|---|---|---|---|
| (structure: cyclohexanone with allyl group) | 2-Allyl cyclohexanose | ACHN | Aldrich |
| (structure: n-butyl vinyl ether) | n-Butyl vinyl ether | BVE | BASF |

As hydrosilation takes place most easily in terminal double bonds, all of the tested molecules had one. FIG. 1 presents a reaction scheme of synthesis of $D_4gAME$-monomer from heptamethyl cyclotetrasiloxane and allyl methyl ether via hydrosilation as an example of monomer synthesis, Hydrosilation reactions were monitored by FT-IR (Nicolet 760) The reaction was noted to be ready when strong Si—H IR absorption at $2100\ cm^{-1}$ or C═C absorption at $1650\ cm^{-1}$ disappeared. In most cases the reaction time was about three hours and still some unreacted specimen remained, but butyl vinyl ether hydrosilated in less than half an hour completely leaving no leftover Si—H groups to the reaction mixture.

TABLE 2

| Derivative | Catalyst | Temperature | Reaction time | Comments |
|---|---|---|---|---|
| AME | Pt-DVTMDS | 55-60° C. | 2-3 h | proceeded well |
| AEE | Pt-DVTMDS | 65° C. | 2.5 h | proceeded well |
| BVE | Pt-DVTMDS | 65° C. | 15 min | proceeded well |
| ACHN | Pt-DVTMDS | 70° C. | 2.5 h | proceeded well |

Monomer synthesis was successfully carried out with allyl methyl ether, allyl ethyl ether, n-butyl vinyl ether and allyl cyclohexanone. These all reacted well at 65° C. with 20 ppm of Pt-DVTMDS catalyst. Reaction times varied quite much as can be seen from Table 2. Larger scale (100 g) reactions were carried out in 250 ml round-bottomed flasks with reflux condenser and nitrogen inlet attached. Catalyst had to be added carefully to the reaction mixture, because of the notable exotherm during the first steps of hydrosilation.

Monomer Purification

Before polymerisation monomers had to be distilled to achieve at least 95% purity (determined as area-% from gas chromatograph peaks). Distillation was performed using microdistillation equipment, oil bath and vacuum pump. Pressure was reduced to below 10 mbar and most often oilbath temperature had to be raised to about 110° C. until the main product was distilled. After the distillation, collected monomer distillate was revised for purity with GC-MS and dried with 4 Å molecular sieves by adding about 20 volume-% of sieves to the monomer containers.

Polymerisation

Polymerisation experiments were started at 8 ml vials with approximately 2 g of dried monomer and 50 ppm of catalyst. Different monomers and reaction conditions were tested. The reaction was an anionic ring-opening polymerisation, where both potassium silanolate and phosphazene base catalysts could be useful. FIG. 2 shows a simplified scheme of anionic ring-opening polymerisation of $D_4AEE$. After successful results in this small scale, bigger batches of 10-50 g were made in 30 ml vials and in 100 ml three-neck flasks with reagents, like end-blockers, vinyl comonomers and additive as D'L-α-tocopherol.

All of the tested reagents and their purpose in polymerisation are presented in Table 3. Only one of each type was used in one experiment.

TABLE 3

| Substance | Purpose | Amount used |
|---|---|---|
| 1,3,5,7-tetravinyl-1,3,5,7-tetramethyl cyclotetrasiloxane ($MV_4$, SOY) | vinyl-containing comonomer | 0.10 wt-% |
| 1,3,5-trivinyl-1,3,5-trimethyl cyclotrisiloxane ($MV_3$, Gelest) | vinyl-containing comonomer | 0.70 wt-% |
| Vinylmethylsiloxane-dimethylsiloxane-copolymer, (Gelest) | vinyl-containing copolymer | 10 wt-% |
| 1,1,3,3-tetravinyl dimethylsiloxane, (ABCR) | end-blocker | 0.80 wt-% |
| Vinyl terminated polydimethyl siloxane, DMS-V21 (ABCR) | end-blocker | 1.20 wt-% |
| D'L-α-tocopherol (Roche) | additive | 0.01 wt-% |
| Potassium silanolate (SOY) | catalyst | 50 ppm |
| Phosphazene base (Fluka Chimika) | catalyst | 50 ppm |

Polymerisations were carried out under nitrogen atmosphere and vigorous stirring. Temperature was set to 150° C. Polymerisation time varied from half an hour to two hours, depending on the monomer and temperature. Most of the reactions were quite fast, but stirring and heating was continued for half an hour after the polymerisation occurred to achieve best possible polymerisation degree and yield. At the end the reaction was quenched with tris(trimethylsilyl)phosphate (Fluka Chimika).

A vinyl comonomer, such as 1,3,5,7-tetravinyl-1,3,5,7-tetramethyl cyclotetrasiloxane ($MV_4$), was added to the reaction medium. Also other vinyl-containing substances were tested (see Table 3). Good polymers were achieved using vinylmethylsiloxane-dimethylsiloxane-copolymer, but when these polymers were stored, some cross-linking occurred after a few days. A good solution to this problem was addition of D'L-α-tocopherol (vitamin E), that is an antioxidant and stabiliser. It prevented the unwanted cross-linking and also had a cocatalysing effect on polymerisation; lesser catalyst was needed to initiate the ring opening polymerisation. In Table 4 there are presented a few ring opening polymerisation experiments with $D_4gBVE$, where difference of experiments made with and without D'L-α-tocopherol can be easily seen.

TABLE 4

| Example | D'L-α-tocopherol | Temperature | Catalyst amount needed | Vinyl compound | Gel formation |
|---|---|---|---|---|---|
| 7 | no | 150° C. | 100 ppm | no | no |
| 8 | no | 150° C. | 150 ppm | yes (copolymer) | yes |
| 9 | no | 150° C. | 150 ppm | yes ($MV_3$) | no |
| 10 | no | 150° C. | 250 ppm | yes ($MV_4$) | yes |
| 11 | no | 150° C. | 300 ppm | yes ($MV_4$) | no |
| 12 | yes | 150° C. | 50 ppm | yes (copolymer) | no |
| 13 | yes | 150° C. | 50 ppm | yes ($MV_3$) | no |
| 14 | yes | 150° C. | 50 ppm | yes ($MV_4$) | no |
| 15 | yes | 150° C. | 50 ppm | yes ($MV_4$) | no |
| 16 | yes | 150° C. | 50 ppm | yes ($MV_4$) | no |

In Table 5 there is a summary of the polymerisation experiments made for all of the derivatised monomers.

TABLE 5

| Monomer | Catalyst | Catalyst amount | Temperature | Additive compounds tested | Mw - range (weight average masses) |
|---|---|---|---|---|---|
| $D_4gAEE$ | potassium silanolate | 50-500 ppm | 100-150° C. | D'L-α-tocopherol | 50000-140000 g/mol |
| $D_4gAEE$ | phosphazene base | 50-200 ppm | 120-150° C. | D'L-α-tocopherol, $MV_3$, $MV_4$, vinyl-copolymer, end-blockers | 120000-190000 g/mol |
| $D_4gBVE$ | phosphazene base | 50-200 ppm | 100-150° C. | D'L-α-tocopherol, $MV_3$, $MV_4$, vinyl-copolymer, end-blockers | 120000-200000 g/mol |
| $D_4gACHN$ | phosphazene base | 50-600 ppm | 110-150° C. | D'L-α-tocopherol, $MV_4$, triethylamine | circa 50000 g/mol |

Removal of Low-Molecular Weight Compounds

Low-molecular weight compounds had to be removed from polymer before further processing. If these compounds were left in, resulting elastomer would have poor tensile strength and too large amount of extractable material. Low-molecular weight substances were evaporated from polymer using microdistillation equipment and vacuum pump at small scale. This was not the most effective way to remove the volatiles, so some polymer samples were combined to be able to create large volume enough for using short path distillation device (VTA, VKL 70-4-SKR-TShort Path Distillation Unit). Short path distillation unit was equipped with a vacuum—and diffusion pump and an oil circulating system (Huber. Unistat 385w Circulation Thermolat).

In small scale when microdistillation apparatus was used, temperature was raised to 120° C. and pressure was less than 2 mbar. In bigger scale when short path distillation equipment was used, temperature was 90° C. and pressure about 0.2 mbar.

Elastomer Preparation

After stripping, the polymer was compounded in a small laboratory mixer with 25 wt-% of dried silica (Aerosil R 106) and 1.5 wt-% of tert-butylperoxy-2-ethylhexanoate (TB-PEH). Silica was added gradually in half gram quantities, and the base was mixed for 15 minutes to achieve a homogenous material.

Sample membranes for permeability tests were prepared using laboratory thermal press (Enerpac) with 0.4 mm thick round spacer mould. Material was pressed between release liners and metal plates with 100 bar oil pressure at 120° C. for six minutes.

Slabs for mechanical testing were prepared similarly to permeability samples, but a different, 2 mm thick rectangle shaped (6.1 cm×8.2 cm) spacer was used.

Elastomer films were subsequently post-cured at 100° C. and under 10 mbar pressure for one hour. Especially Poly ($D_4gAEE$) 2 mm thick films got a little yellowish colour during post-cure.

Characterisation

Monomer Analysis with GC-MS

A gas chromatograph-mass spectrometry (GC-MS) equipment (Agilent Technologies) was used to characterise the synthesised monomers. Samples were diluted in n-hexane (approximately 0.1 mg/ml and two injections were taken from each sample. Yields and purity were estimated as area-% of GC peaks and main impurities and side-products were identified from MS spectra, if necessary. The biggest impurity in all of the experiments was the starter material, heptamethyl cyclotetrasiloxane.

Polymer Analysis with GPC

Number—and mass-average molar masses and polydispersity were determined from the synthesised polymers using gel permeation chromatography (GPC). Used GPC equipment consisted of pump (Waters 515), injector (Waters 717Plus), RI-Detector (Waters 2414) and column oven (Perkin-Elmer Model 101 LC Column Oven). Analysis was carried out with five columns and polystyrene standards. Molar masses were determined at range of 162-1000000 g/mol.

Samples were prepared by diluting polymer to toluene (J. T. Baker). Toluene was used also as a carrier solution. Flow was set to 0.3 ml/min. Toluene was run through the equipment the night before measurements were done to stabilise the flow, and to cleanse the columns and injector.

Analysis of Drug Permeability

Drug permeability measurements were carried out using side-bi-side diffusion cells presented schematically in FIG. 3. The system consisted of two similar glass chambers, the donor cell 1 and the receptor cell 2, surrounded by water jackets 3 and equipped with magnetic stirrers 4. The donor cell 1 had saturated concentration of estradiol in 1% cyclodextrin solution (reference number 6). Estradiol diffused through elastomer membrane 5 set between the cells to receptor cell 2 containing a solution (1% cyclodextrin). Used membrane thicknesses were 0.2 and 0.4 mm, each membrane was measured accurately.

Testing time was five days, and every day two 2.8 μl samples were taken from the receptor cell solution via the sampling port 7. After sampling, the taken amount of solution was replaced with pure 37° C. cyclodextrin. Temperature was kept steady at 37° C. with water bath (Lauda) to simulate the conditions in human body.

Taken solution samples were analyzed for estradiol by high performance liquid chromatography (HPLC). From HPLC concentration results, the permeations were calculated by plotting measured concentrations towards time and finding the slope of linear trend-line of plotted points.

Tensile Strength and Elongation

Samples for tensile strength measurements were die-cut from pressed elastomer pieces with desired thickness (2 mm). Test samples were ISO 37 type 2 specimens. Tensile strength was measured using Monsanto T2000 apparatus with 100 N or 1 kN cell. High extensiometer (Gauge length 20 mm) was attached to the equipment to be able to measure the elongation. Rate of extension was 500 mm/min. Before analysis the samples were kept at constant room temperature and moisture for 24 hours (23° C., 50%).

Extractable Material

Amount of hexane-extractable material from elastomer was determined by weighing 0.3 g of elastomer to 30 ml vial and adding 20 ml of n hexane. Three parallel measurements were carried out. Samples were shaken for 24 hours at room temperature and on the next day hexane solution was decanted. Solid samples were rinsed with fresh hexane once more and dried in vacuum oven at 40° C. and at pressure lower than 10 mbar for an hour. After drying, samples were stabilised at room temperature for yet another hour and then weighed. Extractables were calculated as percentage of mass difference between samples before and after treatment.

In addition extractions were analyzed with GPC and GC (Agilent Technologies 6890 N Network GC System. FID detector) to be able to evaluate the amount of common cyclics ($D_4$-$D_6$) in extracted solution and possible larger fragments of extracted species.

Results

Synthesis and Polymers

From all the four tested derivatised monomer candidates two were eventually processed through the whole synthesis route from monomer to elastomer.

Polymer synthesis was carried out successfully with $D_4gAEE$ and $D_4gBVE$. The molar masses were mostly of the order of 140 000 g/mol.

Drug Permeability

Target permeation was ten times that of reference elastomer, an unmodified PDMS. In FIG. 4 there is plotted results of the estradiol permeation measurements for poly($D_4gAEE$), poly($D_4gBVE$) and reference PDMS elastomer membranes. The time in hours in shown in abscissa and the amount of estradiol released in μg is shown in ordinate. The squares stand for poly($D_4gAEE$), the triangles stand for poly($D_4gBVE$) and the diamonds for the references PDMS elastomer.

Tensile Strength and Elongation

Results of tensile strength and elongation measurements are presented in Table 6. First samples were measured without post-curing and with 1 kN cell whereas other set of samples was analysed after post-cure and with 100 N cell, Polymers used for post-cured samples were stripped with more effective short path distillation unit.

TABLE 6

| Polymer | post-cure | Stress/MPa | Elongation |
|---|---|---|---|
| Poly($D_4gAEE$) | no | 2.8 | 190% |
| Poly($D_4gBVE$) | no | 2.3 | 158% |
| Poly($D_4gAEE$) | yes | 2.6 | 127% |
| Poly($D_4gBVE$) | yes | 3.2 | 132% |

Extractable Material

Extractables were measured both with and without post-curing. Results are presented in Table 7. Polymer used for post-cured samples were stripped with more effective short path distillation unit.

TABLE 7

| Polymer | post-cure | extracted material, wt-% |
|---|---|---|
| Poly($D_4gAEE$) | no | 15.70% |
| Poly($D_4gBVE$) | no | 14.30% |
| Poly($D_4gAEE$) | yes | 11.50% |
| Poly($D_4gBVE$) | yes | 6.90% |

The invention claimed is:

1. A method for manufacturing hydrophilic polysiloxanes, wherein a hydrido-containing cyclic siloxane is reacted with a hydrophilic molecule comprising a carbon-carbon double bond, having the general formula (I) or (II)

$$H_2C=CH-(CHR)_n-O-(CHR^1CR^2R^3)_mR^4 \quad (I)$$

$$H_2C=CH-(CHR)_n-R^5 \quad (II)$$

wherein n is an integer from 0 to 4, m is an integer from 0 to 5, R, $R^1$, $R^2$, $R^3$ and $R^4$ are each independently hydrogen or a $C_1$ to $C_6$ alkyl, $R^5$ is a saturated cyclic hydrocarbon containing carbonyl group, in the presence of a first catalyst to obtain a monomer, and polymerising said monomer in the presence of a second catalyst and tocopherol as a co-catalyst.

2. The method according to claim 1, wherein the cyclic siloxane is selected from the group consisting of heptamethyl cyclotetrasiloxane and tetramethyl cyclotetrasiloxane.

3. A method for manufacturing a hydrophilic siloxane elastomer, wherein a hydrido-containing cyclic siloxane is reacted with a hydrophilic molecule comprising a carbon-carbon double bond, having the general formula (I) or (II)

$$H_2C=CH-(CHR)_n-O-(CHR^1CR^2R^3)_mR^4 \quad (I)$$

$$H_2C=CH-(CHR)_n-R^5 \quad (II)$$

wherein n is an integer from 0 to 4, m is an integer from 0 to 5, R, $R^1$, $R^2$, $R^3$ and $R^4$ are each independently hydrogen or a $C_1$ to $C_6$ alkyl, $R^5$ is a saturated cyclic hydrocarbon containing carbonyl group, in the presence of a first catalyst to obtain a monomer, polymerising said monomer in the presence of a second catalyst and tocopherol as a co-catalyst to produce a hydrophilic polysiloxane, and cross-linking said polysiloxane in the presence of a cross-linking catalyst selected from the group consisting of peroxide cross-linking catalysts and platinum cross-linking catalysts.

* * * * *